United States Patent
Mao et al.

(10) Patent No.: US 9,438,122 B2
(45) Date of Patent: Sep. 6, 2016

(54) PHASE ANGLE DETECTION MODULE FOR POWER CONVERTER

(71) Applicant: Power Integrations, Inc., San Jose, CA (US)

(72) Inventors: Mingming Mao, Saratoga, CA (US); Tiziano Pastore, Los Gatos, CA (US); Ricardo Luis Janezic Pregitzer, Campbell, CA (US)

(73) Assignee: Power Integrations, Inc., San Jose, CA (US)

( * ) Notice: Subject to any disclaimer, the term of this patent is extended or adjusted under 35 U.S.C. 154(b) by 115 days.

(21) Appl. No.: 14/580,928

(22) Filed: Dec. 23, 2014

(65) Prior Publication Data
US 2016/0134194 A1    May 12, 2016

Related U.S. Application Data

(60) Provisional application No. 62/077,632, filed on Nov. 10, 2014.

(51) Int. Cl.
| | |
|---|---|
| *H02M 1/08* | (2006.01) |
| *H02M 3/335* | (2006.01) |
| *H02M 5/27* | (2006.01) |
| *H05B 33/08* | (2006.01) |

(52) U.S. Cl.
CPC ......... *H02M 3/33507* (2013.01); *H02M 5/273* (2013.01); *H05B 33/0815* (2013.01)

(58) Field of Classification Search
CPC .............................. H02M 1/08; H02M 1/082
USPC ................................................... 363/95, 97
See application file for complete search history.

(56) References Cited

U.S. PATENT DOCUMENTS

| | | | |
|---|---|---|---|
| 8,558,474 B1 | 10/2013 | Zhang et al. | |
| 9,214,851 B1 * | 12/2015 | Mao | H02M 1/08 |
| 9,331,586 B2 * | 5/2016 | Mao | H02M 3/33515 |
| 2014/0239840 A1 | 8/2014 | Wang et al. | |

(Continued)

FOREIGN PATENT DOCUMENTS

| | | |
|---|---|---|
| EP | 2387294 A2 | 11/2011 |
| EP | 2637481 A2 | 9/2013 |

(Continued)

OTHER PUBLICATIONS

International Application No. PCT/US2015/059603—International Search Report and Written Opinion, mailed Jan. 29, 2016, 13 pages.

*Primary Examiner* — Jeffrey Sterrett
(74) *Attorney, Agent, or Firm* — Blakely Sokoloff Taylor & Zafman LLP

(57) ABSTRACT

A power converter controller asserts a leading edge signal when a leading edge of a voltage signal is detected. The voltage sense signal is representative of an input voltage of the power converter. A trailing edge signal is asserted when a trailing edge of the voltage signal is detected. A first state of a threshold signal is generated when the voltage sense signal is at or above an upper threshold and generating a second state of the threshold signal when the voltage sense signal is at or below a lower threshold. A conduction signal is updated in response to the leading edge signal, the trailing edge signal, and the threshold signal. The conduction signal is for controlling a switch coupled to regulate an output of the power converter.

20 Claims, 7 Drawing Sheets

(56) References Cited

U.S. PATENT DOCUMENTS

| | | | |
|---|---|---|---|
| 2015/0200599 A1* | 7/2015 | Mao | H02M 3/33507 363/21.17 |
| 2015/0295500 A1 | 10/2015 | Mao et al. | |
| 2015/0303812 A1* | 10/2015 | Mao | H02M 3/33515 363/21.13 |
| 2016/0134194 A1* | 5/2016 | Mao | H02M 5/273 363/21.17 |

FOREIGN PATENT DOCUMENTS

| | | |
|---|---|---|
| EP | 2938163 A1 | 10/2015 |
| WO | WO 2013/114242 A1 | 8/2013 |

* cited by examiner

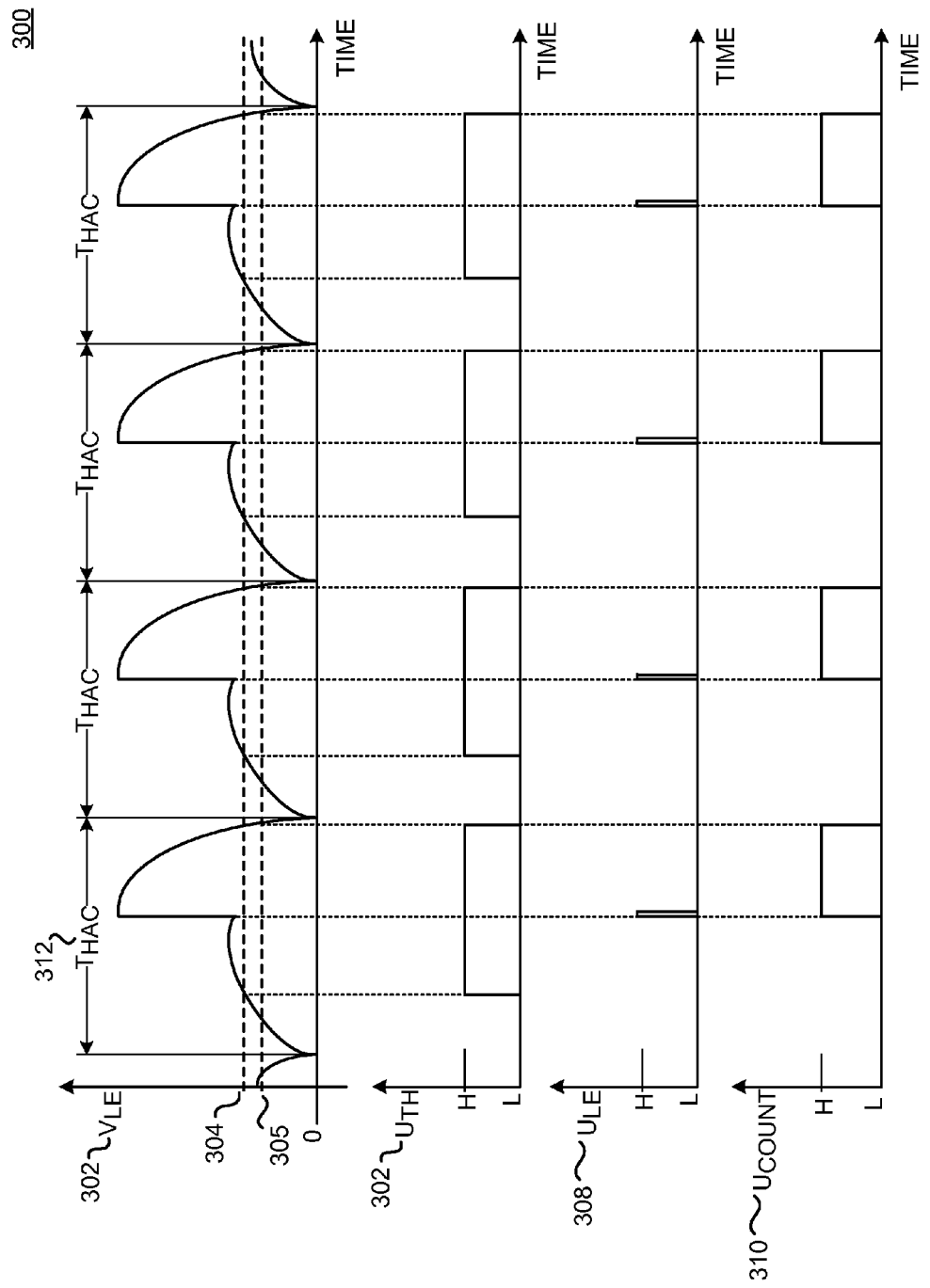

PHASE ANGLE DETECTION MODULE FOR POWER CONVERTER

CROSS-REFERENCE TO RELATED APPLICATIONS

This application claims priority to U.S. Provisional Application No. 62/077,632 filed on Nov. 10, 2014, the contents of which are incorporated herein by reference.

BACKGROUND INFORMATION

1. Field of the Disclosure

The present invention relates generally to power converters, and more specifically to power converters utilized with dimmer circuits.

2. Background

Electronic devices use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well regulated direct current (dc) output through an energy transfer element. The switched mode power converter control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

In one type of dimming for lighting applications, a triac dimmer circuit typically disconnects the ac input voltage to limit the amount of voltage and current supplied to an incandescent lamp. This is known as phase dimming because it is often convenient to designate the position of the triac dimmer circuit and the resultant amount of missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the triac dimmer circuit disconnects the ac input. As such, removal of half the ac input voltage in a half line cycle by the triac dimmer circuit corresponds to a phase angle of 90 degrees. In another example, removal of a quarter of the ac input voltage in a half line cycle may correspond to a phase angle of 45 degrees.

On the other hand, the conduction angle is a measure of how many degrees (from a reference of zero degrees) of each half line cycle that the triac dimmer circuit does not disconnect the ac input voltage from the power converter. Or in other words, the conduction angle is a measure of how many degrees of each half line cycle in which the triac dimmer circuit is conducting. In one example, the removal of a quarter of the ac input voltage in a half line cycle may correspond to a phase angle of 45 degrees but a conduction angle of 135 degrees.

Although phase angle dimming works well with incandescent lamps that receive the altered ac input voltage directly, it typically creates problems for light emitting diode (LED) lamps. Most LEDs and LED modules are best driven by a regulated current which a regulated power converter can provide from an ac power line. Triac dimmer circuits typically don't work well with conventional regulated power converter controllers. Regulated power supplies are typically designed to ignore distortions of the ac input voltage. Their purpose is to deliver a constant regulated output until a low input RMS voltage causes them to shut off completely. As such, conventional regulated power supplies would not satisfactorily dim the LED lamp. Unless a power converter for an LED lamp is specially designed to recognize and respond to the voltage from a triac dimmer circuit in a desirable way, a triac dimmer is likely to produce unacceptable results such as flickering or shimmering of the LED lamp with large conduction angles and flashing of the LED lamp at low conduction angles.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3A is a timing diagram illustrating how a conduction angle is generated from a leading edge waveform, in accordance with an example of the present invention.

Figure 1A:
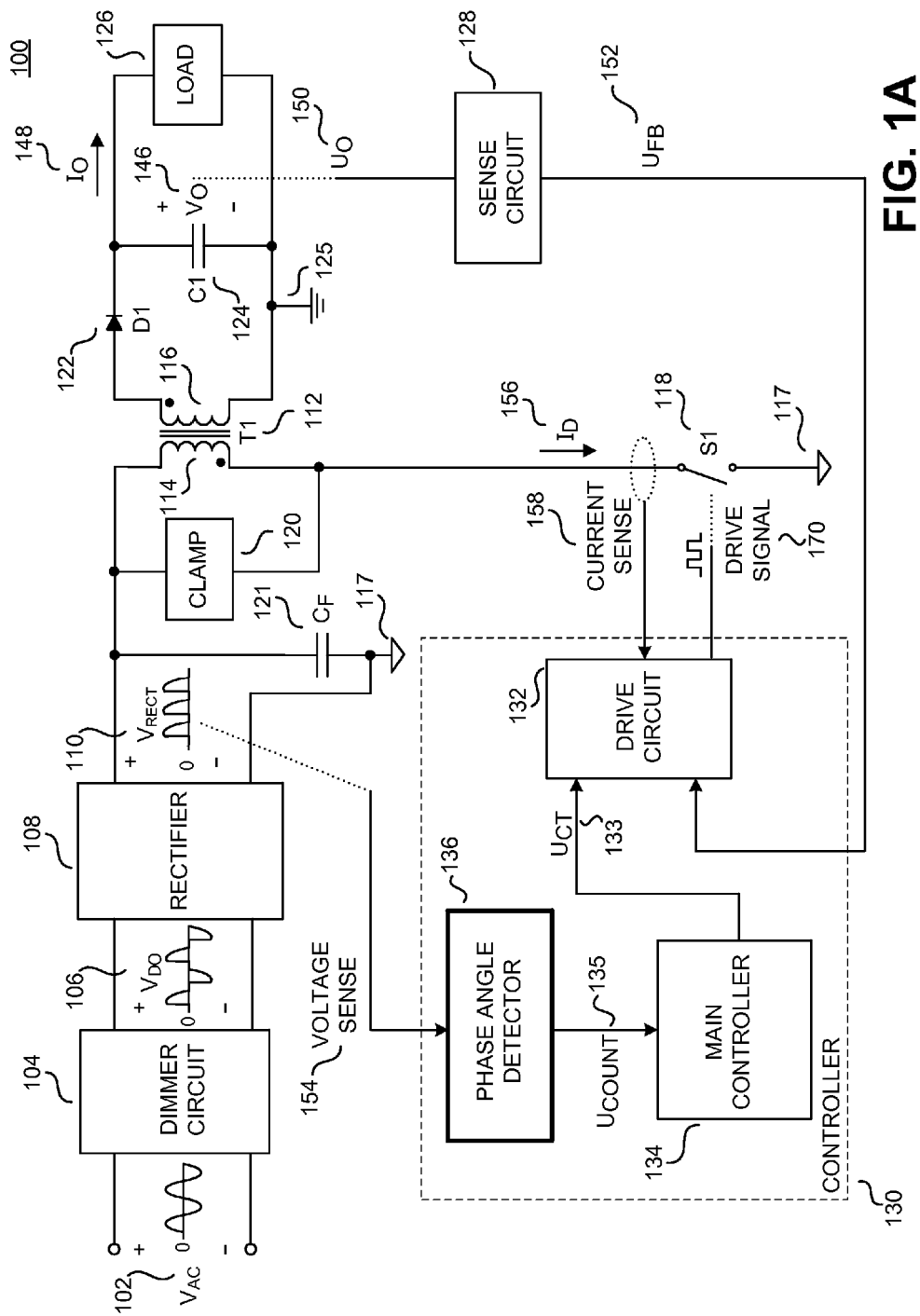
FIG. 1A is a functional block diagram illustrating an example power converter with a dimmer circuit utilizing a controller, in accordance with an example of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of a power converter controller and a method of operating the power converter controller are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For phase dimming applications, including those for light emitting diodes (LEDs), a phase dimmer circuit typically disconnects the ac input voltage for a portion of every half line cycle to limit the amount of voltage and current supplied to the LEDs. As mentioned above, typically, the phase angle is a measure of how many degrees of each half line cycle the dimmer circuit has disconnected the input. For example, the half line cycle of the ac input voltage may have a total of 180 degrees. As such, removal of half the ac input voltage in a half line cycle by the dimmer circuit corresponds to a phase angle of 90 degrees. In another example, removal of a quarter of the ac input voltage in a half line cycle may correspond to a phase angle of 45 degrees.

Circuits may not always operate as intended due to non-ideal effects. Dimmer circuits may cause the measured conduction time to be inaccurate. Examples in this disclosure may improve accuracy of readings of the conduction angle when distorted effects occur. Examples in this disclosure may also assist in delivering the correct amount of power to the load based on the mechanical position of a dimmer circuit.

Referring first to FIG. 1A, a functional block diagram of an example power converter 100 is illustrated including ac input voltage $V_{AC}$ 102, a dimmer circuit 104, a dimmer output voltage $V_{DO}$ 106, an input rectifier 108, a rectified voltage $V_{RECT}$ 110, an energy transfer element T1 112, a primary winding 114 of the energy transfer element T1 112, a secondary winding 116 of the energy transfer element T1 112, a switch S1 118, input return 117, a clamp circuit 120, an output rectifier D1 122, an input capacitor $C_F$ 121, an output capacitor C1 124, a load 126, a sense circuit 128, and a controller 130. Controller 130 further includes a drive circuit 132, a main controller 134, and a phase angle detector circuit 136.

FIG. 1A further illustrates an output voltage $V_O$ 146, an output current $I_O$ 148, an output quantity $U_O$ 150, a feedback signal $U_{FB}$ 152, a voltage sense signal 154, a switch current $I_D$ 156, a current sense signal 158, a conduction time signal $U_{COUNT}$ 135, and a conduction time signal $U_{CT}$ 133. The example switched mode power converter 100 illustrated in FIG. 1A is coupled in a flyback configuration, which is just one example of a switched mode power converter that may benefit from the teachings of the present invention. A non-isolated power converter such as a flyback converter wherein galvanic isolation prevents dc current from flowing the between the input and output of the power supply. It is appreciated that other known topologies and configurations of switched mode power converters may also benefit from the teachings of the present invention. In addition, the example power converter shown in FIG. 1A is an isolated power converter. It should be appreciated that non-isolated power converters may also benefit from the teachings of the present invention.

The power converter 100 provides output power to the load 126 from an unregulated input voltage. In one embodiment, the input voltage is the ac input voltage $V_{AC}$ 102. In another embodiment, the input voltage is a rectified ac input voltage such as rectified voltage $V_{RECT}$ 110. As shown, dimmer circuit 104 receives the ac input voltage $V_{AC}$ 102 and produces the dimmer output voltage $V_{DO}$ 106. The dimmer circuit 104 may be utilized to limit the voltage delivered to the power converter 100. In one embodiment, the dimmer circuit 104 may be a phase dimming circuit such as a triac phase dimmer. In another embodiment, the dimmer circuit 104 may be a Metal-Oxide-Semiconductor Field Effect Transistor ("MOSFET") dimmer circuit. The dimmer circuit 104 further couples to the input rectifier 108 and the dimmer output voltage $V_{DO}$ 106 is received by the input rectifier 108.

The input rectifier 108 outputs rectified voltage $V_{RECT}$ 110. In one embodiment, rectifier 108 may be a bridge rectifier. The rectifier 108 further couples to the energy transfer element T1 112. In some embodiments of the present invention, the energy transfer element T1 112 may be a coupled inductor. In other embodiments, the energy transfer element T1 112 may be a transformer. In a further example, the energy transfer element 112 may be an inductor. In the example of FIG. 1, the energy transfer element T1 112 includes two windings, a primary winding 114 and a secondary winding 116. However, it should be appreciated that the energy transfer element T1 112 may have more than two windings. In the example of FIG. 1A, primary winding 114 may be considered an input winding, and secondary winding 116 may be considered an output winding. The primary winding 114 is further coupled to switch S1 118, which is then further coupled to input return 117.

In addition, the clamp circuit 120 is illustrated in the example of FIG. 1 as being coupled across the primary winding 114 of the energy transfer element T1 112. The input capacitor $C_F$ 121 may couple across the primary winding 114 and switch S1 118. In other words, the input capacitor $C_F$ 121 may couple to the input rectifier 108 and input return 117. Secondary winding 116 of the energy transfer element T1 112 is coupled to the output rectifier D1 122. In the example of FIG. 1, the output rectifier D1 122 is exemplified as a diode. However, in some embodiments the rectifier D1 122 may be a transistor used as a synchronous rectifier. Both the output capacitor C1 124 and the load 126 are shown in FIG. 1A as being coupled to the output rectifier D1 120. An output is provided to the load 126 and may be provided as either a regulated output voltage $V_O$ 146, regulated output current $I_O$ 148, or a combination of the two. In one embodiment, the load 126 may be a light emitting diode (LED), an LED module or an LED array.

The power converter 100 further comprises circuitry to regulate the output which is exemplified as output quantity $U_O$ 150. In general, the output quantity $U_O$ 150 is either an output voltage $V_O$ 146, an output current $I_O$ 148, or a combination of the two. A sense circuit 128 is coupled to sense the output quantity $U_O$ 150 and to provide feedback signal $U_{FB}$ 152, which is representative of the output quantity $U_O$ 150. Feedback signal $U_{FB}$ 152 may be a voltage signal or a current signal. In one example, the sense circuit 128 may sense the output quantity $U_O$ 150 from an additional winding included in the energy transfer element T1 112. In another example, there may be a galvanic isolation (not shown) between the controller 130 and the sense circuit 128. The galvanic isolation could be implemented by using devices such as an opto-coupler, a capacitor or a magnetic coupling.

Controller 130 is coupled to the sense circuit 128 and receives the feedback signal $U_{FB}$ 152 from the sense circuit 128. The controller 130 further includes terminals for receiving the voltage sense signal 154, current sense signal 158 and for providing the drive signal 170 to power switch S1 118. In the example of FIG. 1A, the voltage sense signal 154 may be representative of the rectified voltage $V_{RECT}$ 110. However, in other examples the voltage sense signal 154 may be representative of the dimmer output voltage $V_{DO}$ 106. The voltage sense signal 154 may be a voltage signal or a current signal. The current sense signal 158 may be representative of the switch current $I_D$ 156 in the power switch S1 118. Current sense signal 158 may be a voltage signal or a current signal. In addition, the controller 130 provides drive signal 170 to the power switch S1 118 to control various switching parameters to control the transfer of energy from the input of power converter 100 to the output of power converter 100. Examples of such parameters may include switching frequency, switching period, duty cycle, or respective ON and OFF times of the power switch S1 118.

As illustrated in the example of FIG. 1, the controller 130 includes the drive circuit 132, main controller 134, and phase angle detector 136. Drive circuit 132 is coupled to control switching of switch 118 (via drive signal 170) in response to feedback signal $U_{FB}$ 152. In addition, the drive circuit 132 may also be coupled to be responsive to the current sense signal 158. Although a single controller is illustrated in FIG. 1A, it should be appreciated that multiple controllers may be utilized by the power converter 100. In addition, the drive circuit 132, main controller 134, and phase angle detector 136 need not be within a single controller. For example, the power converter 100 may have a primary controller coupled to the input side of the power converter 100 and a secondary controller coupled to the output side of the power converter 100. The phase angle detector circuit block 136 and main controller 134 may be included in the secondary controller, and the drive circuit 132 may be included in the primary controller. The output of the main controller 134 may be sent to the drive circuit 132 through a communication link, such as magnetic coupling.

Phase angle detector 136 is coupled to generate a conduction signal which is representative of conduction time of the dimmer circuit 104. In one example, the phase angle detector 136 may be coupled to generate the conduction signal which is representative of the conduction time that an input signal (e.g. $V_{RECT}$ 110) is above a threshold value (e.g. zero volts). In the illustrated example, phase angle detector 136 is coupled to receive the voltage sense signal 154 from $V_{RECT}$ 110 and output the conduction time signal $U_{COUNT}$ 135. The main controller 134 is coupled to receive the conduction time signal $U_{COUNT}$ 135. The main controller 134 generates an output conduction time signal $U_{CT}$ 133. The drive circuit 132 is coupled to receive the conduction time signal $U_{CT}$ 133 and the feedback signal $U_{FB}$ 152.

In operation, the power converter 100 of FIG. 1A provides output power to the load 126 from an unregulated input such as the ac input voltage $V_{AC}$ 102. The dimmer circuit 104 may be utilized to limit the amount of voltage delivered to the power converter. For the example of an LED load, when the dimmer circuit 104 limits the voltage delivered to the power converter, the resultant current delivered to the load of LED arrays by the controller 130 is also limited and the LED array dims. As mentioned above, the dimmer circuit 104 may be a phase dimming circuit such as a triac dimmer circuit or a Metal-Oxide-Semiconductor Field Effect Transistor ("MOSFET") dimmer circuit. For leading edge dimming, the dimmer circuit 104 disconnects the ac input voltage $V_{AC}$ 102 when the ac input voltage $V_{AC}$ 102 crosses zero voltage. After a given amount of time, the dimmer circuit 104 reconnects the ac input voltage $V_{AC}$ 102 with the power converter 100. The amount of time before the dimmer circuit reconnects the ac input voltage $V_{AC}$ 102 is set by a user. For trailing edge dimming, the dimmer circuit 104 connects the input to the power converter when the ac input voltage $V_{AC}$ 102 crosses zero voltage. After a given amount of time set by a user, the dimmer circuit 104 then disconnects the ac input voltage $V_{AC}$ 102 for the remainder of the half cycle. In other words, the dimmer circuit 104 may interrupt the phase of the ac input voltage $V_{AC}$ 102 at a phase angle of zero and 180 degrees. Depending on the desired amount of dimming, the dimmer circuit 104 controls the amount of time the ac input voltage $V_{AC}$ 102 is disconnected from the power converter 100. In general, a lower light intensity corresponds to a longer period of time during which the dimming circuit 104 disconnects the ac input voltage $V_{AC}$ 102. As will be further discussed, the phase angle may be determined by measuring the period of time during which the dimming circuit 104 disconnects the ac input voltage $V_{AC}$ 102. On the other hand, the conduction angle may be determined by measuring the period of time which the dimmer circuit 104 does not disconnect the ac input voltage $V_{AC}$ 102.

The dimmer circuit 104 produces the dimmer output voltage $V_{DO}$ 106 which is received by input rectifier 108. The input rectifier 108 produces the rectified voltage $V_{RECT}$ 110. The input capacitor $C_F$ 121 filters the high frequency current from the switch S1 118. For other applications, the input capacitor $C_F$ 121 may be large enough such that a substantially dc voltage is applied to the energy transfer element T1 112. However, for power supplies with power factor correction (PFC), an input capacitor $C_F$ 121 may be utilized to allow the voltage applied to the energy transfer element T1 112 to substantially follow the rectified voltage $V_{RECT}$ 110. As such, the value of the input capacitor $C_F$ 121 may be chosen such that the voltage on the input capacitor $C_F$ 121 reaches substantially zero during each half-line cycle of the ac input voltage $V_{AC}$ 102. Or in other words, the voltage on the input capacitor $C_F$ 121 substantially follows the absolute value of the dimmer output voltage $V_{DO}$ 106. As such, the controller 130 may detect when the dimmer circuit 104 disconnects and reconnects the ac input voltage $V_{AC}$ 102 from the power converter 100 by sensing the voltage on the input capacitor $C_F$ 121 (or in other words the rectified voltage $V_{RECT}$ 110). In another example, the controller 130 may detect when the dimmer circuit 104 disconnects and reconnects the ac input voltage $V_{AC}$ 102 from the power converter 100 by sensing the switch current $I_D$ 156. In a further example, the controller 130 may detect that the dimmer circuit 104 disconnects and reconnects the ac input voltage $V_{AC}$ 102 from the power converter 100 by sensing the input current (in one example, the current flowing between the input rectifier 108 and input capacitor $C_F$ 121).

The switching power converter 100 utilizes the energy transfer element T1 112 to provide galvanic isolation between the primary 114 and the secondary 116 windings. The clamp circuit 120 is coupled to the primary winding 114 to limit the maximum voltage on the switch S1 118. Switch S1 118 is opened and closed in response to the drive signal 170. It is generally understood that a switch that is closed may conduct current and is considered on, while a switch that is open cannot conduct current and is considered off. In one example, the switch S1 118 may be a transistor such as a metal-oxide-semiconductor field-effect transistor (MOSFET). In another example, controller 130 may be implemented as a monolithic integrated circuit or may be implemented with discrete electrical components or a combination of discrete and integrated components. Controller 130 and switch S1 118 could form part of an integrated circuit that is manufactured as either a hybrid or monolithic integrated circuit. In operation, the switching of the switch S1 118 produces a pulsating current at the output rectifier D1 122. The current in the output rectifier D1 122 is filtered by the output capacitor C1 124 to produce a substantially constant output voltage $V_O$ 146, output current $I_O$ 148, or a combination of the two at the load 126.

The sense circuit 128 senses the output quantity $U_O$ 150 of the power converter 100 to provide the feedback signal $U_{FB}$ 152 to the controller 130. The feedback signal $U_{FB}$ 152 may be a voltage signal or a current signal and provides information regarding the output quantity $U_O$ 150 to the controller 130. In addition, the controller 130 receives the current sense input signal 158 which relays the switch current $I_D$ 156 in the switch S1 118. The switch current $I_D$ 156 may be sensed in a variety of ways, such as for example the voltage across a discrete resistor or the voltage across a transistor when the transistor is conducting. In addition, the controller 130 may receive the voltage sense signal 154 which may relay the value of the rectified voltage $V_{RECT}$ 110. The rectified voltage $V_{RECT}$ 110 may be sensed a variety of ways, such as for example through a resistor divider.

In one example, the controller 130 may determine the phase angle or conduction angle by utilizing the rectified voltage $V_{RECT}$ 110 provided by the voltage sense signal 154 or through the switch current $I_D$ 156 provided by the current sense input signal 158, or a combination of the two. For example, the controller 130 may measure the length of time which the dimmer circuit connects or disconnects the ac input voltage $V_{AC}$ 102 from the power converter. For determining the phase angle, the controller measures the length of time which the ac input voltage $V_{AC}$ 102 is substantially equal to zero. For determining the conduction angle, the controller measures the length of time which the ac input voltage $V_{AC}$ 102 is not substantially equal to zero. The length of time may be divided by the length of time of the half line cycle or the full line cycle to determine the phase or conduction angle.

The phase angle detector 136 contained in controller 130 determines the conduction angle of rectified voltage $V_{RECT}$ 110. The phase angle detector 136 may be able to distinguish a voltage signal that contains a leading edge or trailing edge. Dimmer circuits generally produce an input rectified voltage that is leading edge or trailing edge. As mentioned previously, the dimmer circuit may cause the voltage sense signal to be distorted. The phase angle detector 136 may disregard conduction times that are distorted. The details of phase angle detector 136 will be further discussed in FIG. 1B.

Figure 1B:
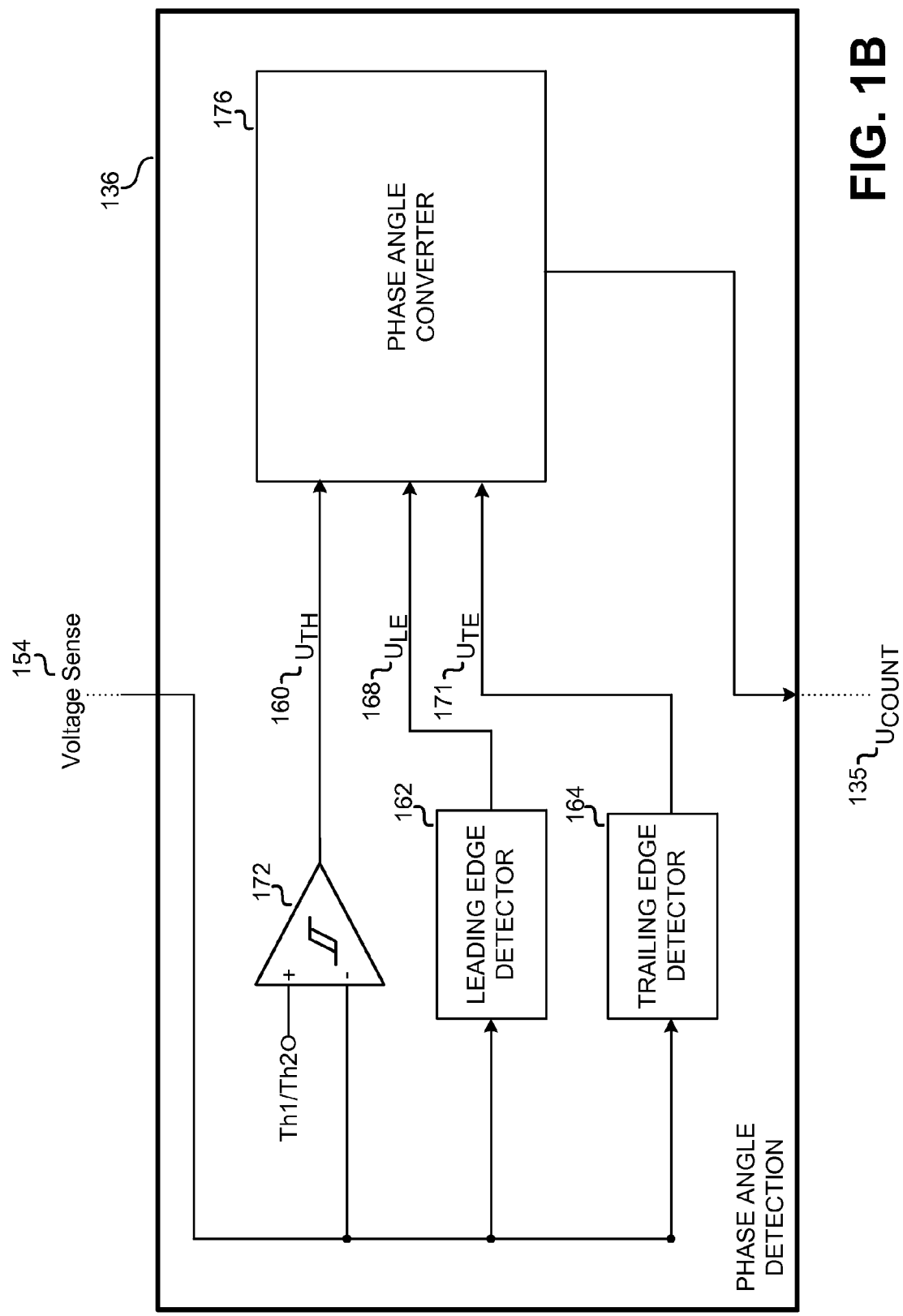
FIG. 1B is a block diagram illustrating a phase angle detector block within a controller of a power converter, in accordance with an example of the present invention.

FIG. 1B is a block diagram illustrating phase angle detector 136 within a controller of a power converter, in accordance with an example of the present invention. Phase angle detector 136 may include a threshold module 172, a leading edge detector 162, a trailing edge detector 164, and a phase angle converter 176. The phase angle detector 136 is coupled to output $U_{COUNT}$ 135 in response to receiving voltage sense signal 154.

Threshold module 172 is coupled to output threshold signal $U_{TH}$ 160 in response to receiving voltage sense signal 154. Threshold module 172 is configured to generate a first state of threshold signal $U_{TH}$ 160 when voltage sense signal 154 is at or above an upper threshold and configured to generate a second state of threshold signal $U_{TH}$ 160 when voltage sense signal 154 is at or below a lower threshold. In the illustrated embodiment, threshold module 172 is a Schmitt trigger. In the illustrated embodiment, if voltage sense signal 154 is equal to a higher threshold (Th2), threshold signal $U_{TH}$ 160 may go to a first state (e.g. logic high) until threshold signal $U_{TH}$ 160 reaches a lower threshold (Th1) where threshold signal $U_{TH}$ 160 will go to a second state (e.g. logic low) until threshold signal $U_{TH}$ 160 gets back to the higher threshold (Th2).

The leading edge detector 162 is coupled to receive the voltage sense signal 154. Leading edge detector 162 determines if the rectified voltage $V_{RECT}$ 110 is a leading edge signal. It should be appreciated there are numerous ways to implement this, as understood by those skilled in the art. The leading edge detector 162 asserts a leading edge signal $U_{LE}$ 168 in response to detecting a leading edge in the voltage sense signal 154. An asserted leading edge signal $U_{LE}$ 168 is a logic high while an unasserted leading edge signal $U_{LE}$ 168 is a logic low, in one example.

The trailing edge detector 164 is coupled to receive the voltage sense signal 154. Trailing edge detector 164 determines if the rectified voltage $V_{RECT}$ 110 is a trailing edge signal. It should be appreciated there are numerous ways to implement this, as understood by those skilled in the art. The trailing edge detector 164 asserts an output signal $U_{TE}$ 171 in response to detecting a trailing edge in the voltage sense signal 154. An asserted trailing edge signal $U_{TE}$ 171 is a logic high while an unasserted trailing edge signal $U_{TE}$ 171 is a logic low, in one example.

Phase angle converter 176 is coupled to receive leading edge signal $U_{LE}$ 168, trailing edge signal $U_{TE}$ 171, and threshold signal $U_{TH}$ 160. Phase angle converter 176 is coupled to output conduction time signal $U_{COUNT}$ 135 in response to leading edge signal $U_{LE}$ 168, trailing edge signal $U_{TE}$ 171, and threshold signal $U_{TH}$ 160.

Figure 1C:
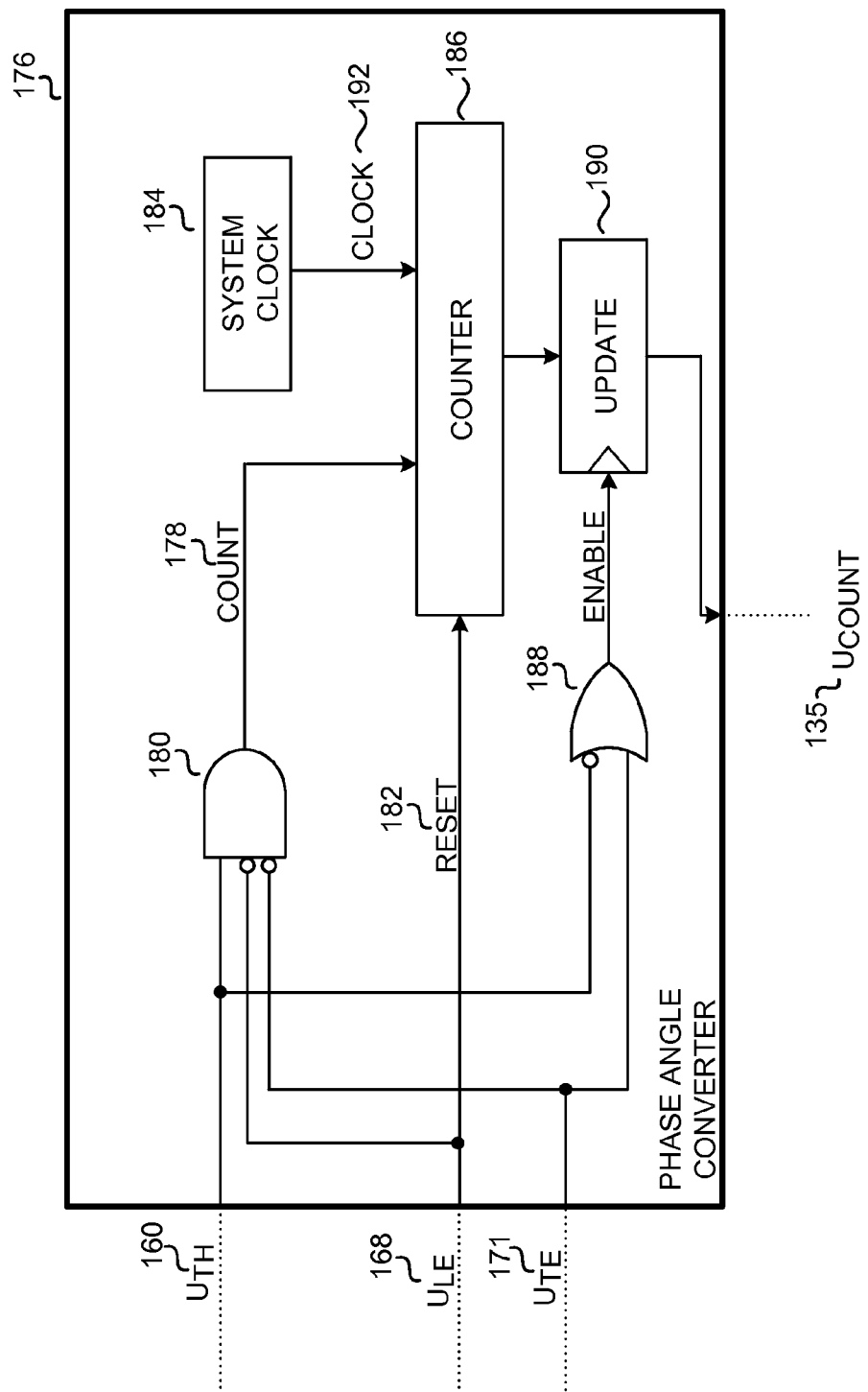
FIG. 1C is a block diagram illustrating an example phase angle converter included in the phase angle detector of FIG. 1B, in accordance with an example of the present invention.

FIG. 1C is a block diagram illustrating an example phase angle converter 176, in accordance with an example of the present invention. FIG. 1C includes a counter 186, a system clock module 184, an update block 190, logic 180, and logic 188. Counter 186 is coupled to receive a clock signal 192 from system clock module 184. In one example, the frequency of the clock 192 is 512 times greater than the frequency of the ac input voltage $V_{AC}$ 102.

Counter 186 is coupled to be incremented on each clock signal 192 when threshold signal $U_{TH}$ 160 has the first state (logic high in FIG. 1C), leading edge signal $U_{LE}$ 168 is unasserted (logic low in FIG. 1C), and trailing edge signal $U_{TE}$ 171 is unasserted (logic low in FIG. 1C). In the illustrated embodiment, logic 180 includes a three input AND gate and outputs count signal 178. The bottom two inputs of the three input AND gate include inverters. When count signal 178 is logic high, counter 186 is incremented. In the example illustrated in FIG. 1C, count signal 178 is high when threshold signal $U_{TH}$ 160 is logic high, leading edge signal $U_{LE}$ 168 is logic low, and trailing edge signal $U_{TE}$ 171 is logic low. Counter 186 is coupled to be reset when leading edge signal $U_{LE}$ 168 is asserted (logic high in FIG. 1C).

Update block 190 is coupled to receive a count from counter 186. When update block 190 is triggered by logic 188, conduction time signal $U_{COUNT}$ 135 is updated with the count from counter 186. The count may be in the form of a digital value. Logic 188 includes an OR gate in the illustrated embodiment. Update block 190 is triggered when at least one of trailing edge signal $U_{TE}$ 171 is asserted (logic high in FIG. 1C) or threshold signal $U_{TH}$ 160 is in the second state (logic low in FIG. 1C). Logic 188 may generate a pulse to trigger update block 190 when trailing edge signal $U_{TE}$ 171 is asserted or threshold signal $U_{TH}$ 160 is in the second state.

Figure 2A:
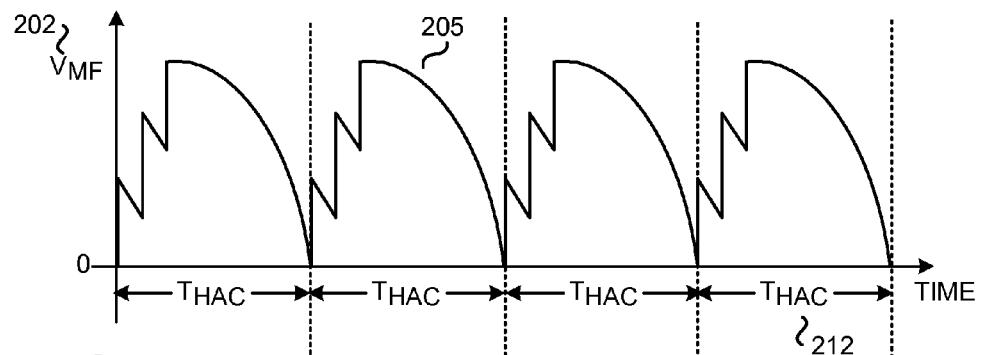
FIGS. 2A-2C are diagrams illustrating example waveforms of a triac that is multiple firing, a leading edge dimmer circuit, and a trailing edge dimmer circuit, in accordance with an example of the present invention.

FIG. 2A illustrates an example waveform 205 from the dimmer circuit with a voltage $V_{MF}$ 202 for a single half line cycle $T_{HAC}$ 212. Waveform 205 represents a scenario where the dimmer circuit in FIG. 1A has turned on and off more than once in a single half line cycle. When the dimmer circuit repeatedly turns on and off, it may cross the lower and upper thresholds several times. For a 230 volt ac input power, 90 volts may represent a lower threshold, and 120 volts may represent an upper threshold. This signal from dimmer circuits may generate erroneous dimming signals from conventional power supply controllers that are used for dimming lighting in response to dimmer circuit signals. Waveform 205 may results in counter 186 starting and pausing several times. To avoid calculating an erroneous conduction angle, the phase angle detector 136 may only update conduction time signal $U_{COUNT}$ 135 if the rectified voltage $V_{RECT}$ 110 stays below the lower threshold for a minimum amount of time. One example of the minimum time period may be 200 microseconds.

Figure 2B:
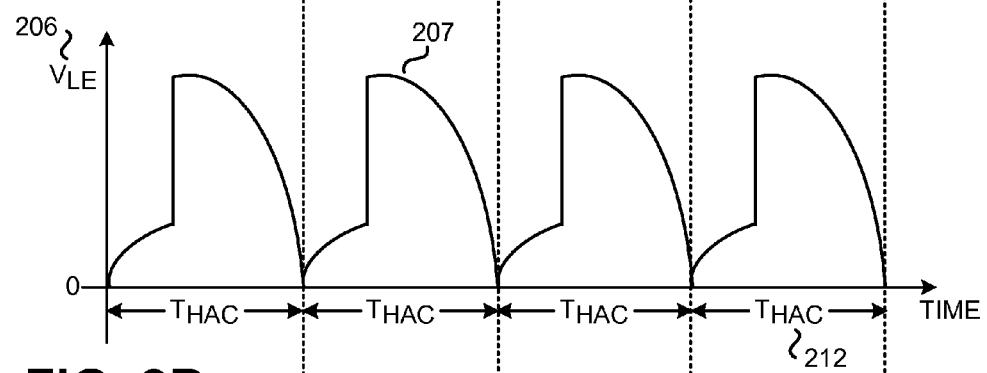

FIG. 2B illustrates an example waveform 207 of one way a leading edge dimmer circuit may affect the input rectified voltage as shown in $V_{LE}$ 206 for a single half line cycle $T_{HAC}$ 212. Leading edge waveform 207 may be affected by leakage current from the dimmer circuit. Triacs and MOSFETs do not stop the flow of current instantaneously when switched off due to non-ideal affects. This leakage also may cause erroneous calculations and dimming in conventional power controllers. However, in the described examples of this disclosure, even if counter 186 starts incrementing the count in response to the leakage voltage in leading edge waveform 207 rising above a certain threshold, the leading edge is detected and counter 186 is reset to zero and continues to count the conduction angle of the legitimate dimming signal and then update conduction time signal $U_{COUNT}$ 135 via update block 190. Update block 190 ensures that only legitimate counts are "published" as conduction time signal $U_{COUNT}$ 135.

Figure 2C:
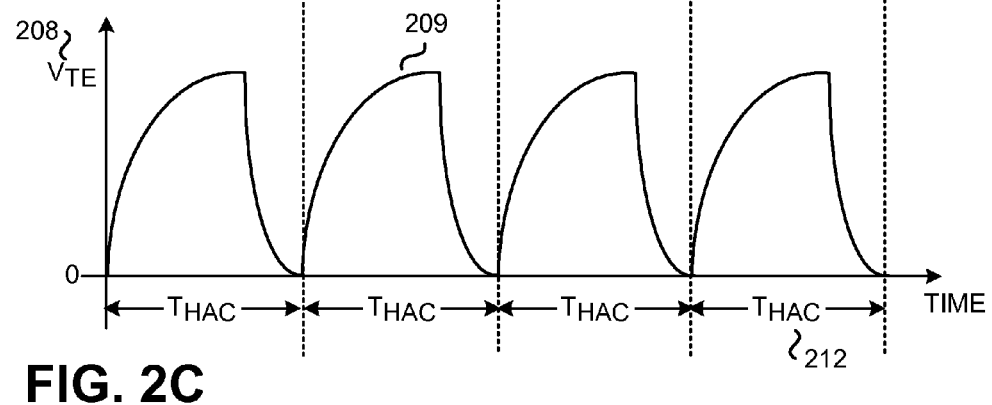

FIG. 2C illustrates an example waveform 209 of one way a trailing edge dimmer circuit may affect the input rectified voltage as shown in $V_{TE}$ 208 for a single half line cycle $T_{HAC}$ 212. Trailing edge waveform 209 may be affected by leakage current from the dimmer circuit. This leakage current/voltage in trailing edge waveform 209 may also cause conventional power supply controllers to calculate erroneous conduction angles and generate erroneous dimming. However, in the described examples of this disclosure, the count for calculating the conduction angle stops incrementing when the trailing edge is detected so that the leakage current/voltage does not contribute to the calculation of the conduction angle.

Another way the counter reading may be affected is if the triac is unbalanced. When a triac is unbalanced, a controller may only detect one half cycle but not the other. This situation may occur in cases of a low conduction angle. To address this unbalance phase angle detector 176 may disregard (and not update conduction time signal $U_{COUNT}$ 135) the count when it only detects one half cycle but not the other.

Phase angle detector 176 may also disregard count readings if the rectified voltage crosses the threshold going down for more than the minimum time and then crosses back up going up more than twice in a line cycle. Additionally, phase angle detector 176 may disregard count readings if the rectified voltage only crosses one of the thresholds, but not both.

FIG. 3A illustrates a timing diagram with an example rectified voltage $V_{LE}$ 302 for a half line cycle $T_{HAC}$ 312. The upper dashed line 304 represents an upper voltage threshold corresponding to the upper threshold (Th2) of threshold module 172. For a 230 volt ac input power, 120 volts may represent the upper threshold. The lower dashed line 305 represents a lower voltage threshold (Th1) corresponding to the lower threshold of threshold module 172. For a 230 volt ac input power, 90 volts may represent the lower threshold. Waveform 306 is an example of threshold module signal $U_{TH}$ 160. Waveform 308 is an example of leading edge detector signal $U_{LE}$ 168. Waveform 310 is an example of conduction time signal $U_{COUNT}$ 135.

In operation, threshold module signal $U_{TH}$ 306 goes to a logic high value when rectified voltage $V_{LE}$ 302 (or a representation of rectified voltage $V_{LE}$ 302) reaches the upper threshold 304 at a given frequency. Threshold module signal $U_{TH}$ 306 remains logic high until rectified voltage $V_{LE}$ 302 drops below the lower threshold 305. Leading edge detector signal 308 pulses to a logic high value when the leading edge of waveform 302 is detected. This resets the count in counter 186. Counter 186 then increments the count until threshold module signal 306 goes to logic low (when rectified voltage $V_{LE}$ 302 goes below the lower threshold 305). In a scenario when duration of conduction time signal $U_{COUNT}$ 135 going logic high corresponds to the count of counter 186 (as illustrated), conduction time signal $U_{COUNT}$ 310 is high for the length of time that counter 186 was incrementing the count. When threshold signal $U_{TH}$ 160 falls below lower threshold 305, update block 190 is triggered to update conduction time signal $U_{COUNT}$ 135 based on the most recent count of counter 186.

Figure 3B:
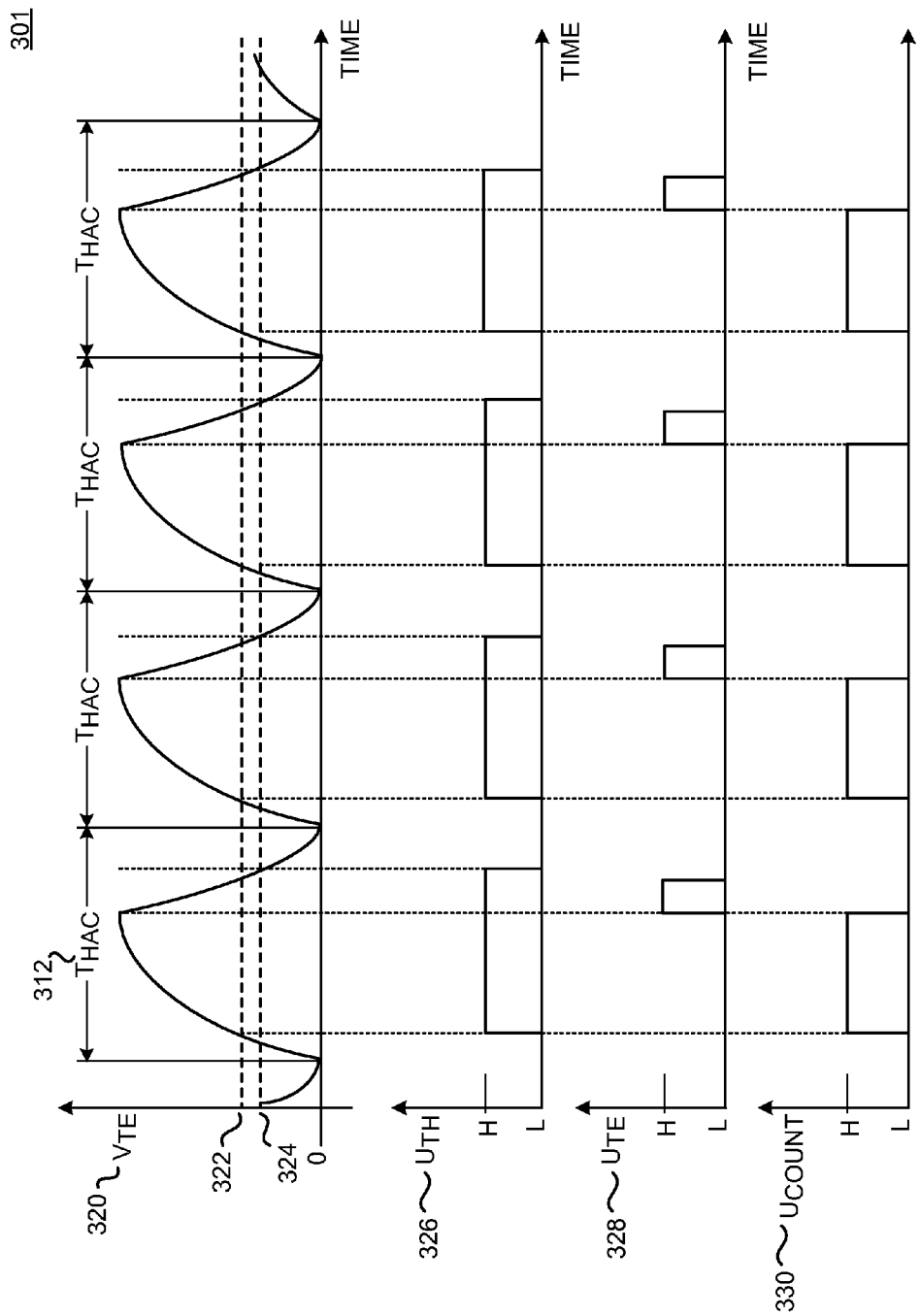
FIG. 3B is a timing diagram illustrating how a conduction angle is generated from a trailing edge waveform, in accordance with an example of the present invention.

FIG. 3B illustrates a timing diagram with the example rectified voltage $V_{TE}$ 320 for a half line cycle $T_{HAC}$ 312. The upper dashed line 322 represents an upper voltage threshold corresponding to the upper threshold of threshold module 172. For a 230 volt ac input power, 120 volts may represent the upper threshold. The upper dashed line 324 represents a lower voltage threshold corresponding to the lower threshold of threshold module 172. Waveform 326 is an example of threshold signal $U_{TH}$ 160. Waveform 328 is an example of trailing edge signal $U_{TH}$ 171. Waveform 310 is an example of conduction time signal $U_{COUNT}$ 135.

In operation, threshold module signal $U_{TH}$ 326 goes to a logic high value when rectified voltage $V_{LE}$ 302 (or a representation of rectified voltage $V_{LE}$ 302) reaches the upper threshold 322 at a given frequency. Threshold signal $U_{TH}$ 326 remains logic high until rectified voltage $V_{LE}$ 320 drops below the lower threshold 324. Trailing edge detector signal $U_{TH}$ 328 is logic low when rectified voltage $V_{LE}$ 302 reaches upper threshold 322 since no trailing edge has been detected. Leading edge signal $U_{LE}$ 168 would also be logic low in response to rectified voltage $V_{LE}$ 302, which makes count signal 178 logic high. Counter 186 then increments the count until trailing edge detector signal $U_{TE}$ 328 goes logic high when a trailing edge is detected. This causes count signal 178 to go logic low and counter 186 stops incrementing the count. In a scenario when duration of conduction time signal $U_{COUNT}$ 135 going logic high corresponds to the count of counter 186 (as illustrated), conduction time signal 330 is high for the length of time that counter 186 was incrementing the count. When conduction time signal $U_{COUNT}$ 330 328 goes high from trailing edge detector 162 asserting the trailing edge signal $U_{TE}$ 171, update block 190 is triggered to update conduction time signal $U_{COUNT}$ 135 based on the most recent count of counter 186.

Figure 4:
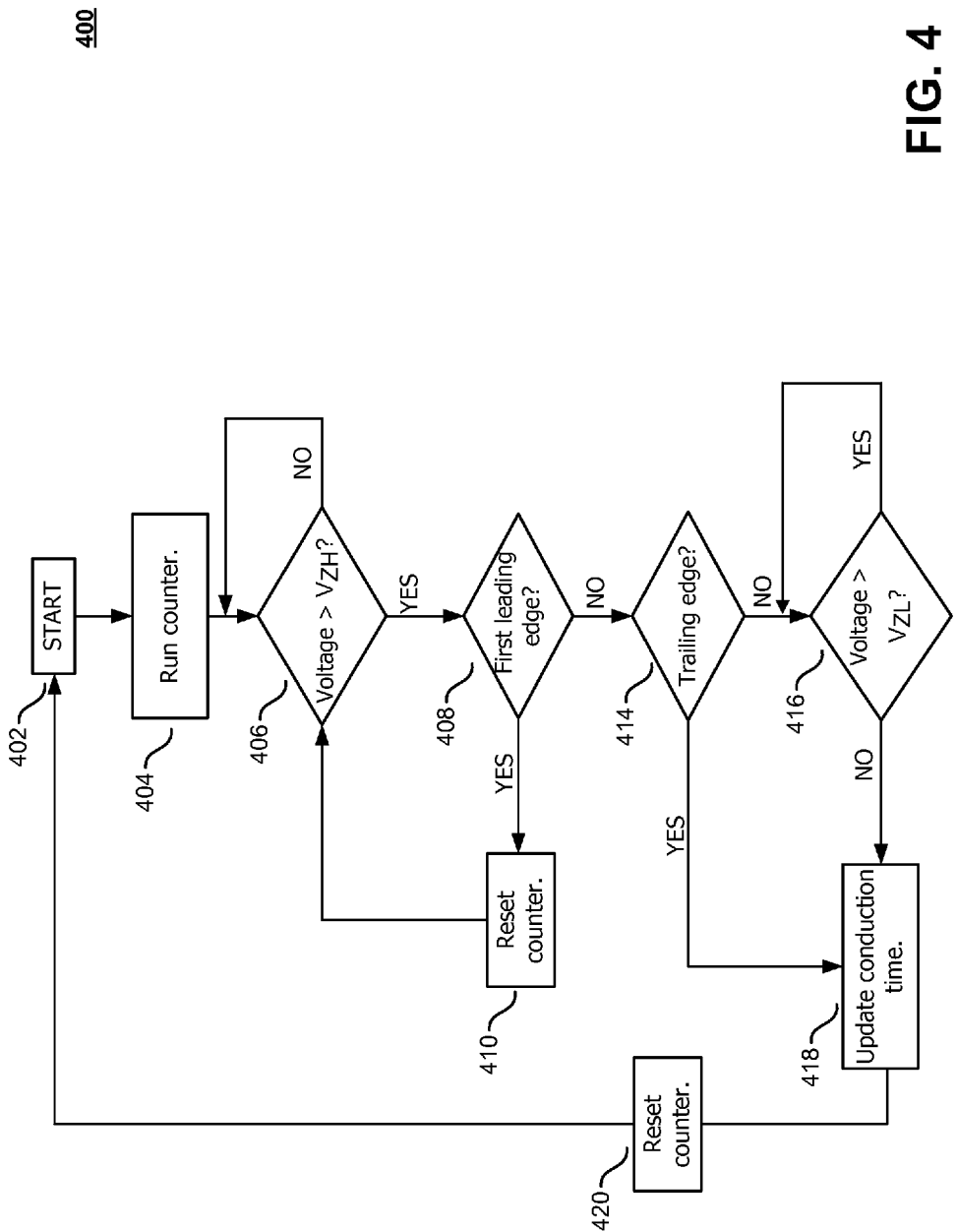
FIG. 4 is a flow diagram illustrating an example process for detecting the phase angle of a dimmer circuit, in accordance with an example of the present invention.

FIG. 4 is a flow diagram illustrating an example process 400 for detecting the phase angle of a dimmer circuit, in accordance with an example of the present invention. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Process 400 begins at start block 402 and continues to process block 404. The counter within the phase angle converter may have the counter running in parallel to process 400. The controller may not acknowledge the value of the counter until certain conditions are met. Process 400 proceeds to decision block 406. If an input voltage (e.g. voltage sense signal 154) is greater than an upper threshold voltage (e.g. threshold 304 or 322), process 400 continues to process block 408. If the input voltage is not greater than the upper threshold voltage, process 400 loops to block 408 until the decision block 406 is true. At process block 408, a counter (e.g. counter 186) is reset if a first leading edge of the input voltage is detected. If a leading edge is not detected in process block 408, process 400 continues to process block 414. If a trailing edge of the input voltage is not detected in process block 414, the counter continues to increment and process 400 continues to process block 416. In process block 416, the counter continues to increment and process 400 loops to block 416 if the input voltage is greater than the lower threshold voltage (e.g. 305 or 324). If the input voltage is not greater than the lower threshold voltage, process 400 proceeds to block 418. At process block 418, the update block within the phase angle converter enables a digital signal $U_{COUNT}$ to be published. The published counter value may not be a direct correlation of the conduction time, and additional processing or logic may be required. The controller may also determine if the input voltage remains below the lower threshold for a minimum amount of time. One example of the minimum amount of time is 200 microseconds. If the voltage does not remain below the lower threshold for a minimum amount of time, the counter value may be disregarded. Process 400 proceeds to block 420 and the counter is reset. Process 400 proceeds to returns to start block 402. It is appreciated that process 400 may also be implemented with an input signal (e.g. input current) instead of an input voltage.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A switched mode power converter comprising:
   a switch;
   an energy transfer element coupled to the switch; and
   a controller coupled to the switch to regulate an output of the switched mode power converter, wherein the controller includes:
      a phase angle detector coupled to output a conduction signal in response to a voltage sense signal, wherein the voltage sense signal is representative of an input voltage of the switched mode power converter, the phase angle detector comprising:
         a leading edge detection module coupled to assert a leading edge signal in response to detecting a leading edge in the voltage sense signal;
         a trailing edge detection module coupled to assert a trailing edge signal in response to detecting a trailing edge in in the voltage sense signal;
         a threshold module coupled to generate a first state of a threshold signal when the voltage sense signal is at or above an upper threshold and coupled to generate a second state of the threshold signal when the voltage sense signal is at or below a lower threshold; and
         a phase angle converter module coupled to receive the leading edge signal, the trailing edge signal, and the threshold signal, and further coupled to output the conduction signal; and
      a drive circuit coupled to output a drive signal in response to the conduction signal, wherein the switch is coupled to regulate an output of the switched mode power converter in response to the conduction signal.

2. The switched mode power converter of claim 1, wherein the phase angle converter module includes a counter, and wherein the counter is coupled to be incremented when the threshold signal has the first state, the leading edge signal is unasserted, and the trailing edge signal is unasserted, and further wherein the counter is coupled to be reset when the leading edge signal is asserted.

3. The switched mode power converter of claim 2, wherein the phase angle converter module includes an update block coupled to receive a count from the counter, the update block coupled to update the conduction signal with the count when at least one of the trailing edge signal is asserted or the threshold signal has the second state.

4. The switched mode power converter of claim 3, wherein the phase angle detector only updates the conduction signal when the voltage sense signal stays below the lower threshold for a minimum amount of time.

5. The switched mode power converter of claim 1, wherein the threshold module includes a Schmitt trigger coupled to generate the threshold signal in response to the voltage sense signal.

6. The switched mode power converter of claim 1, wherein the conduction signal is representative of a conduction time of a dimmer circuit coupled to control the switched mode power converter.

7. The switched mode power converter of claim 1 further comprising a sense circuit coupled to sense the output of the switched mode power converter, wherein the drive circuit is coupled to output the drive signal in response to a feedback signal received from the sense circuit.

8. A controller for a power converter, the controller comprising:
   a phase angle detector coupled to output a conduction signal in response to a voltage sense signal, wherein the voltage sense signal is representative of an input voltage of the power converter, the phase angle detector comprising:
      a leading edge detection module coupled to assert a leading edge signal in response to detecting a leading edge in the voltage sense signal;
      a trailing edge detection module coupled to assert a trailing edge signal in response to detecting a trailing edge in in the voltage sense signal;
      a threshold module coupled to generate a first state of a threshold signal when the voltage sense signal is at or above an upper threshold and coupled to generate a second state of the threshold signal when the voltage sense signal is at or below a lower threshold; and
      a phase angle converter module coupled to receive the leading edge signal, the trailing edge signal, and the threshold signal, and further coupled to output the conduction signal; and
   a drive circuit coupled to output a drive signal in response to the conduction signal, wherein the drive signal is for controlling a switch coupled to regulate an output of the power converter.

9. The controller of claim 8, wherein the phase angle converter module includes a counter, and wherein the counter is coupled to be incremented when the threshold signal has the first state, the leading edge signal is unasserted, and the trailing edge signal is unasserted, and further wherein the counter is coupled to be reset when the leading edge signal is asserted.

10. The controller of claim 9, wherein the phase angle converter module includes an update block coupled to receive a count from the counter, the update block coupled to update the conduction signal with the count when at least one of the trailing edge signal is asserted or the threshold signal has the second state.

11. The controller of claim 8, wherein the phase angle detector only updates the conduction signal when the voltage sense signal stays below the lower threshold for a minimum amount of time.

12. The controller of claim 8, wherein the first state of the threshold signal is retained until the threshold signal reaches a lower threshold, and wherein the second state of the threshold signal is retained until the threshold signal reaches the upper threshold.

13. The controller of claim 12, wherein the threshold module includes a Schmitt trigger coupled to generate the threshold signal in response to the voltage sense signal.

14. The controller of claim 8, wherein the conduction signal is representative of a conduction time of a dimmer circuit coupled to control the power converter.

15. A method of operating a controller of a power converter, the method comprising:
   asserting a leading edge signal when a leading edge of a voltage sense signal is detected, wherein the voltage sense signal is representative of an input voltage of the power converter;
   asserting a trailing edge signal when a trailing edge of the voltage sense signal is detected;
   generating a first state of a threshold signal when the voltage sense signal is at or above an upper threshold and generating a second state of the threshold signal when the voltage sense signal is at or below a lower threshold;
   updating a conduction signal in response to the leading edge signal, the trailing edge signal, and the threshold signal, wherein the conduction signal is for controlling a switch coupled to regulate an output of the power converter.

16. The method of claim 15, wherein updating the conduction signal includes:
   incrementing a count when the threshold signal has the first state, the leading edge signal is unasserted, and the trailing edge signal is unasserted; and
   resetting the count when the leading edge signal is detected;
   updating the conduction signal in response to the count, wherein updating the conduction signal with the count occurs when at least one of the trailing edge signal is asserted or the threshold signal has the second state.

17. The method of claim 16, wherein updating the conduction signal includes loading the count into a memory register.

18. The method of claim 15, wherein the threshold signal retains the first state until the threshold signal reaches a lower threshold, and wherein the threshold signal retains the second state until the threshold signal reaches the upper threshold.

19. The method of claim 18, wherein a Schmitt trigger generates the threshold signal in response to receiving the voltage sense signal.

20. The method of claim 15, wherein the conduction signal is representative of a conduction time of a dimmer circuit coupled to control the power converter.

* * * * *